Figures 1, 2:
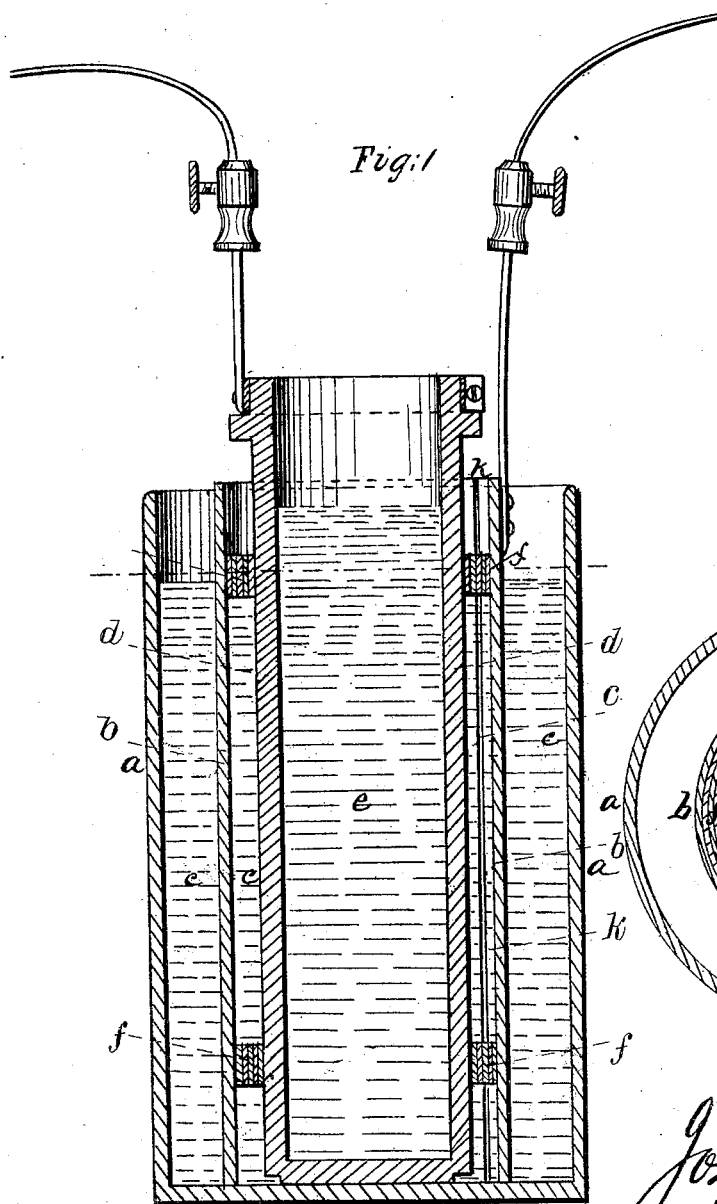

J. DIXON.
Electric Battery.

No. 57,687.  Patented Sept. 4, 1866.

Witnesses

Inventor
Joseph Dixon
by J. Pollok
his atty

UNITED STATES PATENT OFFICE.

JOSEPH DIXON, OF JERSEY CITY, NEW JERSEY.

IMPROVEMENT IN GALVANIC BATTERIES.

Specification forming part of Letters Patent No. 57,687, dated September 4, 1866.

*To all whom it may concern:*

Be it known that I, JOSEPH DIXON, of Jersey City, in the county of Hudson and State of New Jersey, have invented certain new and useful Improvements in the Galvanic Battery; and I hereby declare the following to be a full, clear, and exact description of the same, reference being had to the accompanying drawings, in which—

Figure 1 represents a vertical central section of the cell of a battery with my improvements applied; and Fig. 2 is a horizontal section of the same on the line $x\ x$, Fig. 1.

My invention relates to that species of battery known as "Grove's" battery. In this battery, as is well known, a porous diaphragm is interposed between the outer positive and inner negative elements, through which the nitric or other acid percolates.

The battery thus consists, essentially, of three parts: first, the outer cell, of zinc or other positive metal; second, the inner plate, of copper, carbon, platinum, or other negative element; and, third, the interposed porous diaphragm, of unglazed porcelain or other suitable material. This arrangement of parts, though possessing many advantages, is yet open to serious objection. The interposition of the porous tube or diaphragm between the two elements increases the distance between them; and as the negative plate is necessarily of more limited size than it would be were there no auxiliary diaphragm, the intensity and activity of the electric current is not so great as it might be.

My present invention specially relates to the combination of the porous diaphragm and negative element in one and the same cell. After many years of experiment and trial I have at last perfected an arrangement by which the two parts are combined in the same piece. To make the cell, I take equal parts of pure plumbago or black-lead and clay. After mixing them thoroughly together I turn them up, as is ordinarily done in pottery-work, and bake them in a pottery-kiln. I thus produce a graphite cell in which the two requisites of porousness and that of a good conducting or negative plate are combined. They may be made by stamping or pressing them into shape, or by what is known in the pottery trade as a "jigger;" but they are believed to be better when turned by hand. They may also be made of ordinary plumbago not purified, and the mixture may be varied, as in an ordinary plumbago crucible; but in order to avoid disintegration, and to give the greatest power or conducting property to the cells, the plumbago should be as pure as possible, and the mixture about as above stated.

By employing a cell of this kind with the ordinary zinc cell I am enabled to effect results much superior to those effected by any other battery of like size.

The advantages possessed by my arrangement are apparent. In the same size of cell I can have a negative surface of more extended area than in the ordinary Grove battery, and I am able to bring the negative metal in close proximity with the positive metal, the two being only separated by a fillet or band of vulcanized rubber, wood, or other non-conductor, or by other means. The activity and intensity of the electric current are therefore proportionately increased, its power being much superior to that of a common battery of like size.

I am aware that graphite has been used or attempted to be used by others to assist in the formation of cells, generally the graphite from the inside of gas-retorts; but these attempts have never been so successful as to bring them into use. I have been experimenting myself since 1841 or 1842 with plumbago as a conducting-cell, and have used it in many forms. One of the forms was on the principle of what is now known as a "Smee" battery, in which case I used a plumbago outside cell, with the single fluid. I also used the plumbago in plates between the zinc plates for a single-fluid battery; but I am not yet as well satisfied with the working of any form of battery as with the porous-cell two-fluid battery for intense action. But plumbago manufactures being a specialty in which I have been engaged since 1827, I shall continue to make tests and trials of plumbago as a conductor for batteries in different forms.

To make my invention fully understood, I will further describe it by reference to the accompanying drawings, in which, as before said, Fig. 1 represents a central vertical section, and Fig. 2 a horizontal section, of a cell provided with my above-described improvements.

The outer glass vessel, *a*, and cylindrical plate of zinc $b$ are such as are commonly employed in galvanic batteries, the zinc being open at the side, at $k$, to allow the dilute sulphuric acid $c$ to flow freely around the negative cell $d$. This graphite cell, formed, as above explained, of equal parts of pure plumbago and clay, combines in itself the two qualities of a negative plate and porous diaphragm; and I am enabled to make it of such size that its diameter is but little less than the internal diameter of the positive cell $b$. The two elements are kept from contact with each other by fillets of vulcanized rubber $f$, or bands of wood or other suitable non-conducting material, or by other means. The interior of the cell $d$ is filled with nitric or chromic acid or other oxidizing agent, as indicated at $e$. On account of the increased size of the inner cell, a large amount of the nitric or other acid can be placed therein, so that it will require to be renewed less frequently than in the ordinary battery.

As the advantages resulting from this enlargement of the negative surface and its increased proximity to the positive element, without the interposition of an auxiliary diaphragm, thus rendering the action immediate instead of mediate, have already been set forth, there is no need of repeating them here.

Having therefore fully described my invention, and the manner in which it is or may be carried into effect, what I claim, and desire to secure by Letters Patent, is—

1. The combination, in a galvanic battery, of the porous diaphragm and negative metal or element in one and the same cell, substantially in the manner and for the purposes hereinbefore described.

2. The graphite cell composed of pure plumbago and clay or other material of which plumbago is the conducting ingredient, when combined in the proportions substantially as hereinbefore stated.

In testimony whereof I have signed my name to this specification before two subscribing witnesses.

JOS. DIXON.

Witnesses:
W. B. WILLIAMS,
WM. F. GILBERT.